(12) United States Patent
Giovannetti (10) Patent No.: US 10,605,286 B2
(45) Date of Patent: Mar. 31, 2020

(54) DEVICE FOR JOINING PARTS OF FURNITURE AND FURNISHING ACCESSORIES

(71) Applicant: Häfele Berlin GmbH & Co KG, Berlin (DE)

(72) Inventor: Antonio Giovannetti, Segrate (IT)

(73) Assignee: Häfele Berlin GmbH & Co KG, Berlin (DE)

( * ) Notice: Subject to any disclaimer, the term of this patent is extended or adjusted under 35 U.S.C. 154(b) by 0 days.

(21) Appl. No.: 16/138,975

(22) Filed: Sep. 22, 2018

(65) Prior Publication Data

US 2019/0024690 A1  Jan. 24, 2019

Related U.S. Application Data

(63) Continuation of application No. PCT/EP2017/057084, filed on Mar. 24, 2017.

(30) Foreign Application Priority Data

Mar. 31, 2016  (IT) .................... 102016000033056

(51) Int. Cl.
*F16B 12/20* (2006.01)
*F16B 12/24* (2006.01)
(Continued)

(52) U.S. Cl.
CPC .......... *F16B 12/2027* (2013.01); *F16B 12/24* (2013.01); *F16B 12/46* (2013.01);
(Continued)

(58) Field of Classification Search
CPC . A47B 47/0075; A47B 47/042; A47B 96/066; A47B 2230/0033; A47C 4/02;
(Continued)

(56) References Cited

U.S. PATENT DOCUMENTS 6,148,569 A * 11/2000 Giovannetti ........ F16B 12/2027
403/297
6,276,868 B1 * 8/2001 Vallance ............. F16B 12/2009
403/409.1
(Continued)

FOREIGN PATENT DOCUMENTS

CN       104507637 A      4/2015
CN       105208894 A     12/2015
(Continued)

*Primary Examiner* — Josh Skroupa
(74) *Attorney, Agent, or Firm* — Hackler Daghighian Martino & Novak (57) ABSTRACT

A joining device for parts of furniture and furnishing accessories, of the shelf unit, bookcase, drawer unit, bed frame, seating type and the like, includes a casing or container body suitable for being inserted in a seat formed in one of the components of the item of furniture to be joined and is provided with an expansion bushing externally projecting with respect to a first end or front open end of said casing or container body and suitable for engaging with a further seat of a further component of the item of furniture to be joined to the component wherein the casing or container body is inserted. Said joining device includes a cam mechanism for a linear motion of actuation means co-operating in an expansion deformation movement of the expansion bushing and simultaneous expansion of at least one portion of said casing or container body.

9 Claims, 10 Drawing Sheets

(51) Int. Cl.
*F16B 12/46* (2006.01)
*F16B 13/06* (2006.01)
*A47B 96/06* (2006.01)
*A47B 47/00* (2006.01)
*A47C 4/02* (2006.01)
*A47C 19/00* (2006.01)

(52) U.S. Cl.
CPC ........ *F16B 13/068* (2013.01); *A47B 47/0075* (2013.01); *A47B 96/066* (2013.01); *A47B 2230/0033* (2013.01); *A47C 4/02* (2013.01); *A47C 19/005* (2013.01)

(58) Field of Classification Search
CPC .... A47C 19/005; F16B 5/0092; F16B 5/0614; F16B 12/2009; F16B 12/2027; F16B 12/24; F16B 12/46; F16B 13/068; Y10T 403/55; Y10T 403/557; Y10T 403/76

USPC ......... 403/292, 297, 409.1, DIG. 4, DIG. 12, 403/DIG. 13; 411/25, 33, 54
See application file for complete search history.

(56) References Cited

U.S. PATENT DOCUMENTS

| | | | |
|---|---|---|---|
| 6,299,397 B1 | 10/2001 | Mengel | |
| 7,494,297 B2 * | 2/2009 | Brede | ................ F16B 12/2009 |
| | | | 403/409.1 |
| 2018/0168348 A1 * | 6/2018 | Carnelos | .............. A47B 96/066 |

FOREIGN PATENT DOCUMENTS

| | | | |
|---|---|---|---|
| DE | 10 2009 043179 A1 | 9/2011 | |
| EP | 0 949 424 A2 | 10/1999 | |
| EP | 0949424 A2 | 10/1999 | |
| FR | 1331299 A * | 6/1963 | ............ F16B 5/0614 |
| JP | 2007-232218 A | 9/2007 | |
| JP | 2010-196864 A | 9/2010 | |

* cited by examiner

DEVICE FOR JOINING PARTS OF FURNITURE AND FURNISHING ACCESSORIES

CROSS-REFERENCE TO RELATED APPLICATIONS

This continuation application claims priority to PCT/EP2017/057084 filed on Mar. 24, 2017 which has published as WO 2017/167661 A1 and also the Italian application number 102016000033056 filed on Mar. 31, 2016, the entire contents of which are fully incorporated herein with these references.

DESCRIPTION

Field of the Invention

The present invention relates to an improved device for joining parts of furniture and furnishing accessories.

More particularly the present invention relates to a device suitable for assembling furniture and/or furnishing accessories of the shelf unit, bookcase, drawer unit, bed frame, seating type and the like.

Background of the Invention

As is known, furniture and furnishing accessories are made increasingly frequently by stably and removably joining single parts which will go to define the overall assembly represented, for example, by a bookcase or by a shelf unit, by a chair or by any other item of furniture not made in a single piece but defined by an assembly of single parts.

Such a kit structure entails considerable advantages linked, for example, to a facility of transport of structures, even bulky ones, to the possibility of mounting of the furniture directly on site or, likewise, to the possibility of transport and assembly also by non-expert users.

The retaining elements used to join one to the other the different components or single parts of the furniture are defined, for example, by tie rods or bushings, cams and similar means.

Referring by way of an example to an item of furniture of the bookcase type or to a shelf unit, it comprises typically two vertical uprights tendentially parallel one to the other between which are interposed, along a plane perpendicular to the plane of longitudinal development of the uprights, one or more shelves having the function of defining a surface of resting and support for books, magazines, vases and/or other multiple and different objects.

The assembly of the structure of the frame and of the shelves with respect to said frame can be performed using retaining means represented by bushings or cams inserted in the thickness of the shelves (or of the uprights) and co-operating in clamping with corresponding pins or screws inserted in the uprights (or in the shelves) and which, actuated by means of an appropriate tool (screwdriver or Allen key or the like), cause the rotation of the bushing or of the cam so as to form the restraining of said pin or screw with respect to said bushing or cam.

However these clamping or restraint means entail some major disadvantages linked to the need to form grooves for housing components in co-operation (bushing and screw or pin) in the thickness of the parts in reciprocal coupling (both in the shelves and in the uprights).

Moreover said clamping means entail longer times of assembly since the operative has to insert the bushing or the cam and the screw or pin in the respective seats and, subsequently, act on the screw or pin to perform the clamping.

In order to solve these disadvantages other ways of removable joining have been developed which provide for the use of expansion joints apt to be inserted in the thickness of the uprights or of the shelves, with said joints which comprise an expansion bushing typically made in plastic material and a screw inserted coaxially to said bushing and, likewise, an eccentric bushing inserted in a groove formed in the thickness of one of the parts to be joined and apt to couple with the screw or pin of the expansion joint. The reciprocal clamping between the two components of the furniture takes place by acting with a tool which acts on the eccentric bushing which, rotating, imposes a backward movement of the pin with respect to the bushing wherein the pin is inserted with a consequent radial expansion of the same bushing.

However these traditional expansion joints also entail some major disadvantages linked to the fact that they comprise elements to be inserted in both the parts to be assembled with the consequent need to form suitable grooves and seats in said parts of the furniture.

A further disadvantage is linked to longer assembly times, in that the user has to insert the elements of the expansion joint in the seats of the parts to be joined and, subsequently, has to act on the eccentric bushing to impose the movement of the pin and the consequent expansion of the bushing in its seat.

A further disadvantage is represented by the fact that a possible loosening of the eccentric bushing entails a consequent movement of the pin and a return into a non-expanded position of the bushing of the pin and this may cause an inevitable loosening of the clamping restraint between the parts of the furniture.

EP 0 949 424 A2 describes a device for joining two panels in wood consisting of a pin flattened in its front part. It forms an insertion plate which can be moved longitudinally inside a casing, with a zone of tensioning, one of clamping and one of expansion. The flat front part of the pin has an opening for the insertion of a cam element which can be rotated clockwise to block the device and join the two parts of furniture.

SUMMARY OF THE INVENTION

The object of the present invention is that of obviating the disadvantages stated above.

More particularly an object of the invention is that of providing a joining device for parts of furniture and furnishing accessories which allows a simultaneous attachment to the two parts of the item of furniture to be joined.

A further object of the present invention is that of providing a joining device for parts of furniture and furnishing accessories which, when assembled, is single-part and comprises a reduced number of components.

A further object of the present invention is that of providing a joining device which allows the reduction in the number of machining processes to be performed on the parts to be reciprocally assembled.

A further object of the present invention is that of providing a joining device which does not involve possible risks of loosening of the clamping between the assembled parts.

A further object of the present invention is that of providing a joining device which allows a reduction in the times of assembly together with an easy, convenient and rapid assembly and disassembly of the component parts of the item of furniture (for example the mounting of shelves in a bookcase).

A further object of the present invention is that of making available to users a joining device for parts of furniture or furnishing accessories suitable for guaranteeing a high level of resistance and reliability in time and such, moreover, as to be able to be easily and economically manufactured.

These and other objects are achieved by the apparatus of the invention which has the features as claimed in claim 1.

According to the invention a joining device (10) is provided for parts of furniture and furnishing accessories, of the shelf unit, bookcase, drawer unit, bed frame, seating type and the like, comprising a casing or container body suitable for being inserted in a seat formed in one of the components of the item of furniture to be joined and provided with an expansion bushing externally projecting with respect to a first end or front open end of said casing or container body and suitable for engaging with a further seat of a further component of the item of furniture to be joined to the component wherein the casing or container body is inserted, wherein said joining device comprises a cam mechanism for a linear motion of actuation means co-operating in an expansion deformation movement of the expansion bushing and simultaneous expansion of at least one portion of said casing or container body, with said cam mechanism and actuation means housed in the casing or container body and actuated by a tool.

Advantageous embodiments of the invention are apparent from the dependent claims.

BRIEF DESCRIPTION OF THE DRAWINGS

The constructional and functional features of the joining device for parts of furniture or furnishing accessories of the present invention will be made clearer by the following detailed description, in which reference is made to the accompanying drawings which illustrate an embodiment thereof given solely by way of a non-limiting example and in which:

FIGS. 2' and 2" are plan views from above of the device of FIG. 2 shown in two successive phases of actuation and comprising the actuation tool;

FIG. 2'A is a sectioned enlargement of the circled detail in FIG. 2';

DETAILED DESCRIPTION OF THE PREFERRED EMBODIMENTS

Referring to the aforesaid drawings, the joining device for parts of furniture or furnishing accessories of the present invention, denoted overall by 10 in the aforesaid drawings, comprises a casing or container body 11 with a substantially cylindrical shape, open at both ends, which we will refer to respectively as first end or front end 90 and second end or rear end 91. The container body 11 is defined by an upper half-shell 12 and by a lower half-shell 14, made preferably in plastic material or in another material having a certain flexibility suitable for the purpose and apt to contain the elements described here below.

Figure 4:
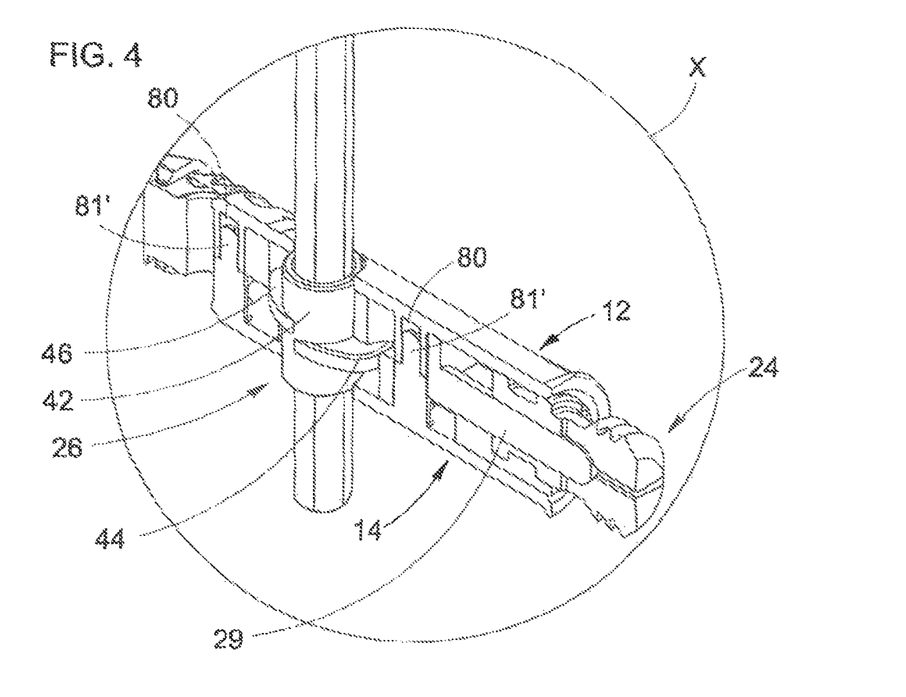
FIGS. 4, 6, 8 show schematically enlarged details of the device of the invention associated, respectively, with FIGS. 3, 5 and 7.
Figure 6:
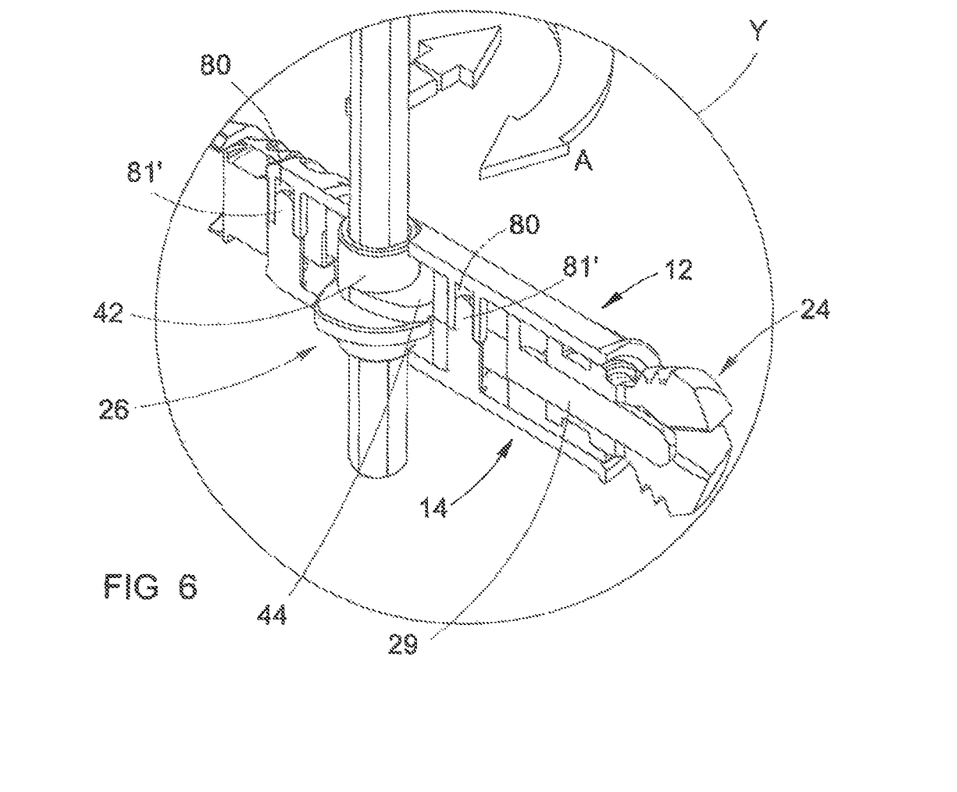
Figure 8:
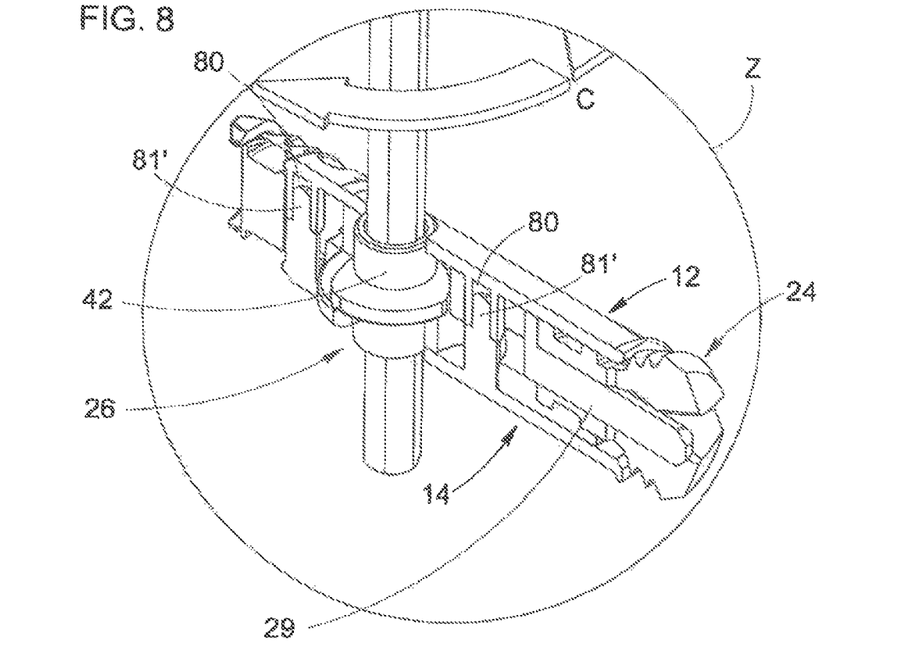

The upper half-shell 12 and the lower half-shell 14 are joined one to the other by means of a connection of the snap-fit type obtained by providing a pair of pegs 80' in the lower half-shell 14 which snap-couple with a corresponding pair of tubular elements 80 provided in the upper half-shell 12 (FIGS. 4, 6, 8). Naturally other systems of attachment between the two half-shells can be provided, for example a screw or grub screw, by gluing or with another known and suitable method of connection.

Following the coupling between the aforementioned half-shells 12 and 14, the container body 11 has at said rear opening 91 a pair of opposite longitudinal slits 92, defined by opposite externally serrated portions 15. The edge 93 of the rear opening 91, or the mouth of said externally serrated portions 15, is bevelled, that is, it has a certain tapering for the purposes to be mentioned here below.

The upper half-shell 12 and the lower half-shell 14 have, respectively, a through hole or opening 18 and 18' whose function will appear clearer here below.

Inside the casing or container body 11 are housed the components apt to perform the clamping between the parts of the furniture as described here below and comprising:
a lower slider 20 placed in the lower half-shell 14;
an upper slider 22 placed in the upper half-shell 12;
an expansion bushing 24; and
a cam mechanism 26.

The lower slider 20 is placed internally and coaxially to the lower half-shell 14 of the casing or container body 11 and comprises a head portion 21 with substantially annular shape, coaxial to the container body and turned in the direction of the first end or front open end of the container body, a base portion 23 turned in the direction of a second end or rear open end of the container body 11, and a central portion 25 intermediate between said head portion 21 and base portion 23 and provided with a through slot 27 coaxial with the through holes or openings 18 and 18' of the two half-shells 12 and 14. In front of the slot 27 a second slot 81, axially elongated, is provided, apt to accommodate one of said peg 80'/tubular element 80 connection pairs, to allow an axial sliding of the slider 20, as will be explained in greater detail here below.

The upper slider 22, placed above the lower slider and at the upper half-shell 12, comprises a first portion 29 of cylindrical shape, developed in the direction of the front open end of the container body 11 and coaxial to the head portion 21 of the lower slider 20, a base wedge-shaped portion 82, placed at the rear open end of the container body 11, whose function is to be described here below, and an intermediate portion 30 provided centrally with a through slot 32 coaxial with the holes or openings 18 and 18' of the two half-shells 12 and 14 and with the through slot 27 of the lower slider 20. In front of and to the rear of the central slot 32 two further slots 81', 81" are provided, the first in alignment with the slot 81 of the lower slider 20, apt to accommodate said peg 80'/tubular element 80 connection pairs, to allow an axial sliding of the upper slider 22, as will be explained in greater detail here below.

Said wedge-shaped base portion 82 of the upper slider 22 has two opposite tilted walls 85 which are arranged at said bevelled edge 93 of the container body 11.

The expansion bushing 24, in the preferred embodiment as per the drawings, is single-part (but could also be made in two or more parts) with tubular shape and is fitted on the cylindrical stem 29 of the upper slider 22 and made integral coaxially with the head portion 21 of the lower slider 20, so that the cylindrical stem 29 can slide axially in the bushing, as will be explained in greater detail here below. The attachment of the bushing 24 to the lower slider 20 takes place by means of coupling between a ribbing with annular development 34 provided in the slider and a corresponding groove 36 formed in the bushing.

The expansion bushing 24 has at the front a cross cut 37 along diametrical perpendicular planes so as to define four wings 38 externally provided with teeth 40 formed in radial direction.

The cam mechanism 26 comprises a central body 42, placed coaxially to the holes or openings 18 and 18', of cylindrical shape and with external diametrical dimensions which correspond substantially to those of the holes or openings 18 and 18' and to the transverse dimension of the through slot 27 of the lower slider 20 and of the further through slot 32 of the upper slider 22. In fact the central body 42 engages with the through slot 27, the further through slot 32 and with the holes or openings 18 and 18' to perform the movement described here below.

Figure 1:
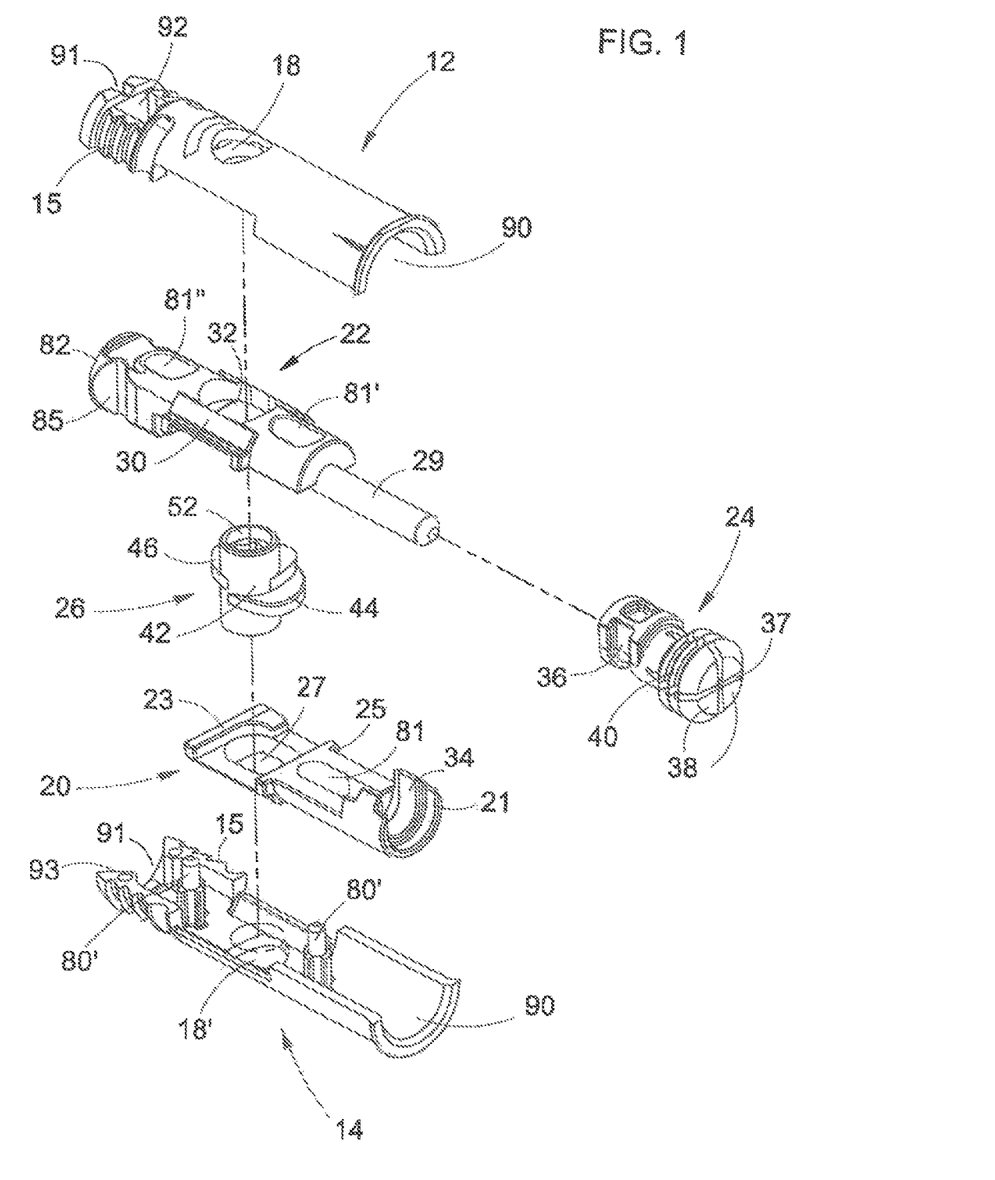
FIG. 1 shows schematically a blown-up axonometric view of the device for joining parts of furniture or furnishing accessories of the present invention.

Said central body 42 comprises, likewise, a central hole 52 shaped to allow the introduction of a tool 54 (not shown in FIG. 1) apt for the actuation of the cam as detailed here below.

From the outer lateral surface of said central body 42 of the cam mechanism 26, at a central portion of said lateral surface, a first lobe 44 or lower lobe and a second lobe 46 or upper lobe develop, substantially opposing and along two planes parallel one to the other and perpendicular to the axis of the central body, apt to come into contact, respectively, with an internal profile of the central portion 25 of the lower slider 20 and with an internal profile of the intermediate portion 30 of the upper slider 22 for the functions described in detail here below.

The profiles of said first lobe 44 and second lobe 46 are chosen as a function of the law of movement or law of the lifts calculated to move, as explained here below, the lower slider 20 and the upper slider 22.

The functioning of the joining device for parts of furniture and furnishing accessories of the present invention, described in detail above with reference to the constructional features, is illustrated here below with reference to FIGS. 3 to 8.

Figure 3:
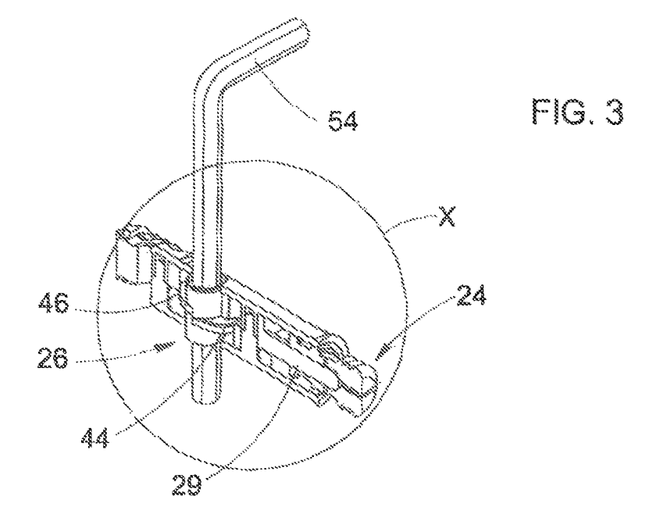
FIGS. 3, 5, 7 show axonometric views of the phases of actuation of the joining device of the invention depicted partially sectioned along a vertical longitudinal plane and comprising the actuation tool.

Referring to FIG. 3 and to the enlarged detail X of FIG. 4, the rest configuration of the joining device of the invention is shown with the tool 54 inserted in the central hole 52 of the central body 42 of the cam 26.

In this configuration the upper slider 22 is in the position of maximum backward movement.

Figure 5:
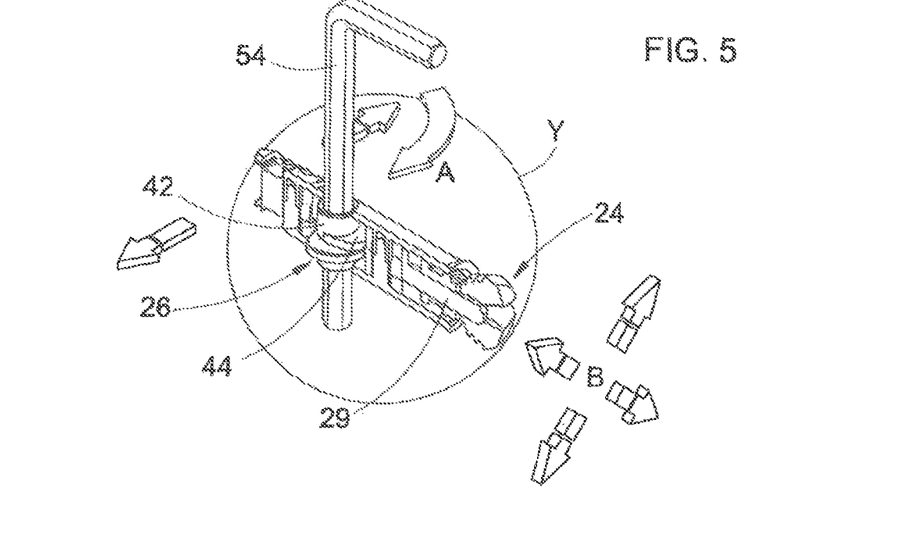

FIG. 5 and the enlarged detail Y of FIG. 6 show a configuration of first actuation displacement of the device of the invention.

More particularly, as indicated by the arrow "A", by means of the tool 54 a rotation is imposed, preferably, through 90° on the cam mechanism 26, as a consequence whereof the second lobe 46 or upper lobe exerts an action of thrust on the internal profile of the intermediate portion 30 of the upper slider 22 which, consequently, translates in the direction of the front open end of the casing or container body 11.

The cylindrical stem 29 of the upper slider 22, following the thrust action exerted by the second lobe 46 of the cam mechanism 26, advances internally and coaxially to the bushing 24, which is integral to the lower slider 20, and imposes an opening in radial direction (as indicated by the arrows "B" in FIG. 5) of the wings 38 causing the expansion of the bushing 24.

During this configuration of first displacement or expansion of the device of the invention the lower slider 20 remains at a standstill.

Figure 2:
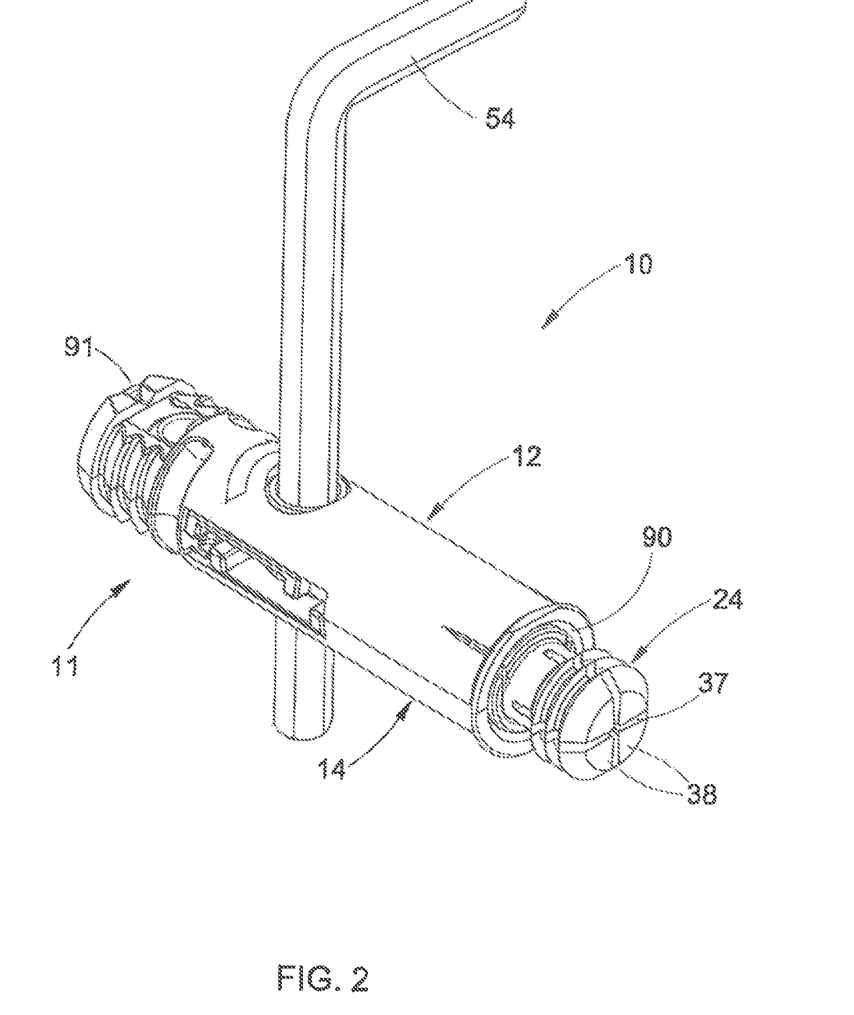
FIG. 2 shows schematically an axonometric view of the device of the invention assembled and provided with the tool for its actuation.

Simultaneous to the expansion of the bushing 24, the wedge-shaped base portion 82 of the upper slider 22, sliding against the bevelled edge 93 of the rear opening 91 of the container body 11, likewise causes the expansion of the opposite externally serrated portions 15, as can be seen more clearly in FIGS. 2' and 2". The two serrated portions 15 are initially joined one to the other at said bevelled edge 93 and are separated in the phase of expansion.

Figure 7:
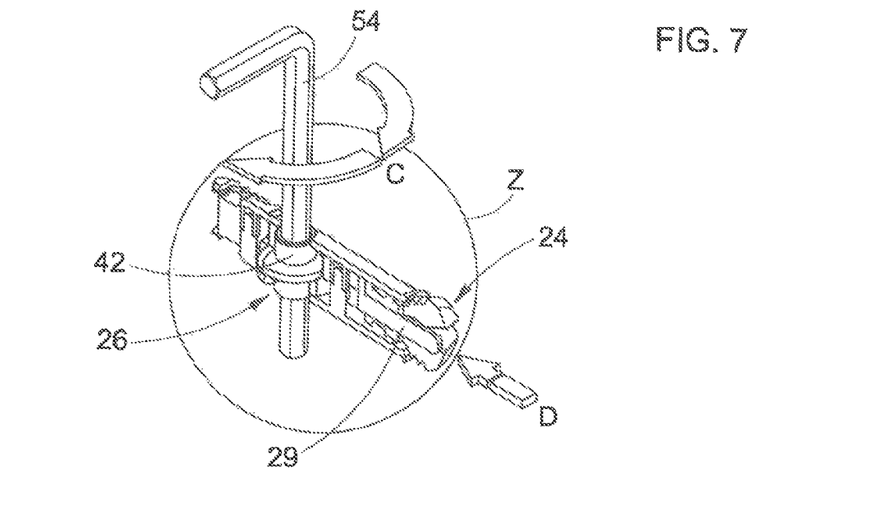

Referring to FIG. 7 and to the enlarged detail Z of FIG. 8, a configuration of second movement of the joining device of the invention is shown.

As indicated by the arrow "C" of the drawings, by means of the tool 54 a further rotation is imposed, preferably through 90°, of the cam mechanism 26. This rotation takes place starting from the configuration of first displacement described previously.

As a consequence of said rotation the first lobe 44 or lower lobe of the cam mechanism 26 exerts a thrust action on the internal profile of the central profile 25 of the lower slider 20 which moves backwards in the direction of the rear opening 91 of the casing or container body 11 as indicated by the arrow "D" in FIG. 7 (the first lobe 44 develops substantially opposite the second lobe 46).

Taking account of the fact that the expansion bushing 24 is coupled to the head portion 21 of the lower slider 20, the backward displacement of said lower slider imposes a consequent and correlated backward movement of the expansion bushing 24. Said lower slider exerts an action of traction of the expansion bushing 24.

During this displacement of the lower slider 20 the upper slider 22 remains at a standstill, in that in constant engagement with the second lobe 46 of the cam mechanism 26 and, taking account of the fact that the expansion bushing 24 also moves backwards, the cylindrical stem 29 of the upper slider 22 engages further in the expansion bushing 24, causing a further radial opening of the wings 38, so as to perform the stable clamping of the parts of the furniture as described here below.

The through slot 27 of the lower slider 20 and the further through slot 32 of the upper slider 22, both with longitudinal development, accompany the sliding of said sliders with respect to the cam mechanism 26 actuated in rotation by means of the tool 54.

FIGS. 9 to 12 illustrate an example of an item of furniture assembled using the joining device of the invention.

Figure 9:
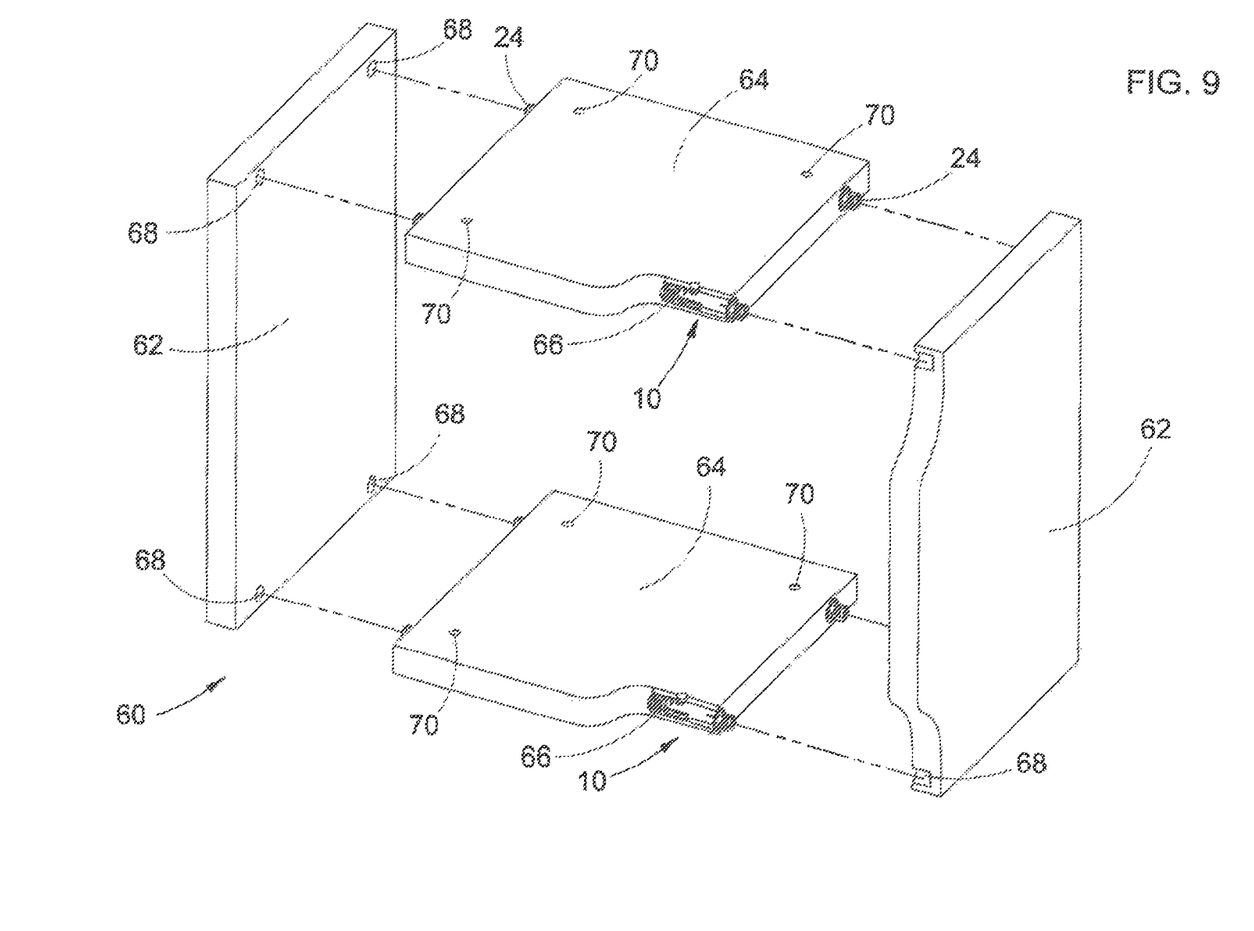
FIG. 9 shows schematically a blown-up axonometric view of an item of furniture apt to be assembled using the joining device of the invention, with said item of furniture partially sectioned to illustrate the housing of said joining device.
Figure 10:
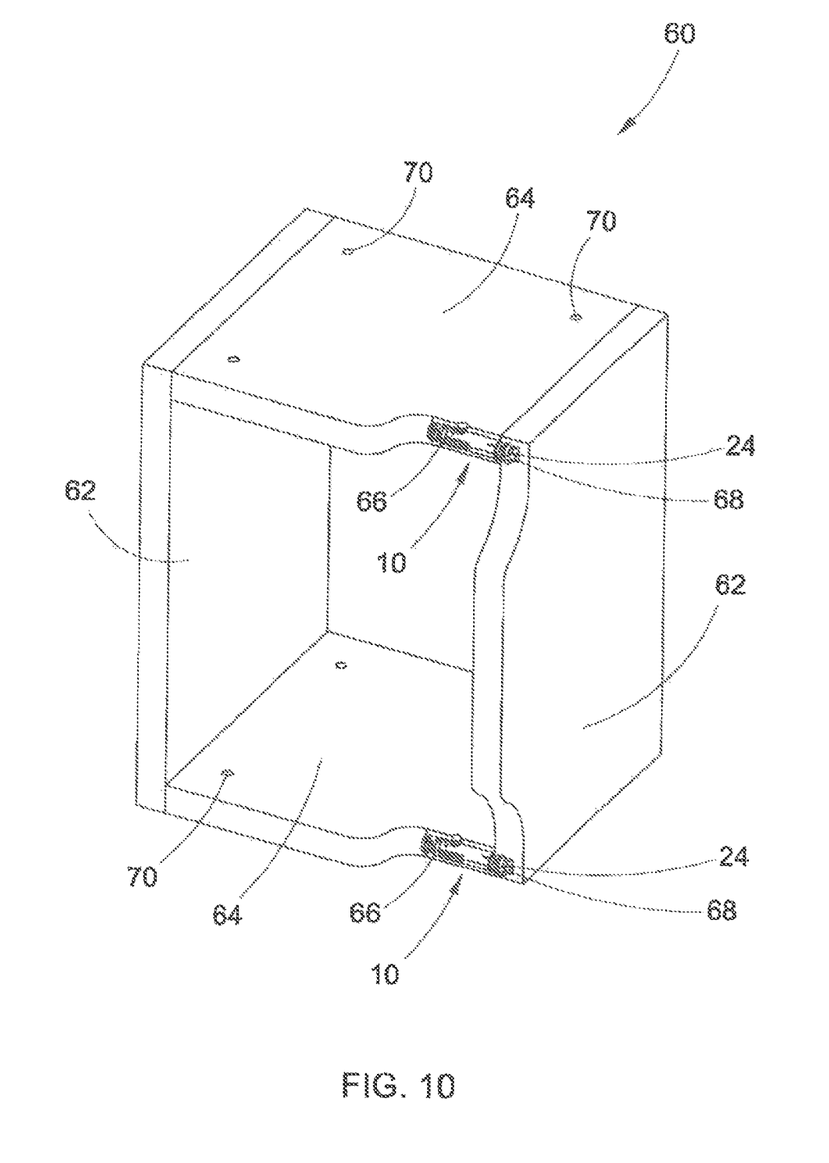
FIG. 10 shows an axonometric schematic view of the item of furniture of FIG. 9, assembled and partially sectioned to illustrate the arrangement of the joining devices of the invention.

FIG. 9 shows a blown-up axonometric view of an item of furniture 60 comprising two opposite and parallel shoulders 62 and two shelves 64 interposed between said opposite shoulders, perpendicular to the same and parallel one to the other.

In the thickness of the shelves 64 grooves or pockets 66 are formed, having the function of housing the joining devices 10 of the invention, inserted in said grooves or pockets with the front portion of the bushing 24 which projects externally to said pocket and is apt to insert in a further pocket 68 formed in the thickness of the shoulders 62.

The shelves 64 have, likewise, holes 70 formed perpendicularly to the axis of the grooves or pockets 66 and having the function of allowing the insertion of the tool 54 which couples with the central hole 52 of the cam mechanism 26 to perform the clamping action.

Figure 11:
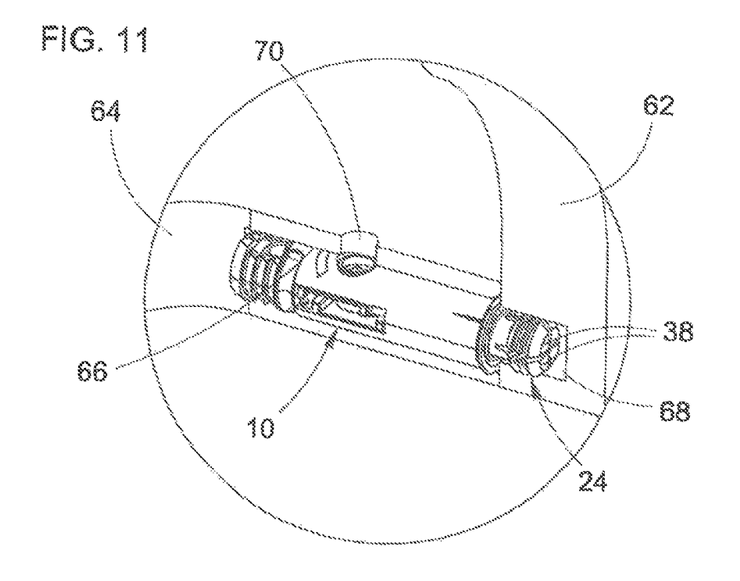
FIGS. 11 and 12 illustrate schematically two enlarged details of the joining device of the invention, said enlarged details representing two phases of clamping between the parts of the item of furniture of FIGS. 9 and 10 after the coupling of said parts.
Figure 12:
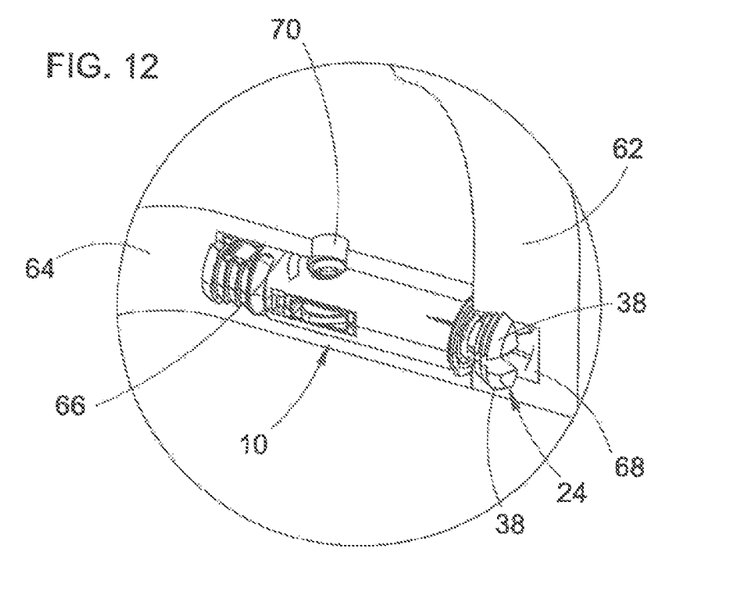

FIGS. 11 and 12 show two enlarged details of a portion of the item of furniture 60 assembled using the joining device of the invention and wherein the device 10, inserted in a groove or pocket 66 of a shelf 64, is shown in the rest configuration with the front portion of the expansion bushing 24 inserted in the further pocket 68 of the shoulder 62 of the item of furniture (detail of FIG. 11) and in the configuration of second movement wherein the expansion bushing, following the action of traction exerted by the lower slider 20, performs the clamping with respect to the walls of said further pocket and, consequently, the rigid and stable connection of the shelf 64 with respect to the shoulder 62.

In fact, the first rotation through 90° of the cam mechanism 26 imposes the expansion of the opposite externally serrated end rear portions 15 with consequent locking of the device 10 in the groove or pocket 66 and the expansion of the expansion bushing 24 with the opening of the wings 38 of said expansion bushing which performs an actuation of clamping with radial stress with respect to the groove or pocket 66. The second rotation through 90° imposes instead a backward movement of the expansion bushing 24 with a further expansion, associating with the radial stress a traction stress between the two components of the item of furniture defining, in this way, a stable clamping between the parts without risks of loosening of the restraint.

The optional disassembly of the item of furniture can be implemented by imposing, by means of the tool 54, a rotation in an opposite direction to that which characterises the phase of assembly/clamping, so as to return the device into the rest configuration. In this case, if required, the device 10 can also be extracted from the groove or pocket 66 of the shelf, where it is no longer restrained, for the return into the non-expanded position of the opposite serrated portions 15.

In particular the passage from the configuration of FIG. 11 to the clamping of FIG. 12 takes place by imposing on the cam 26, by means of the tool 54, an overall rotation of 180° (with reference to the preferred embodiment).

As can be seen from the above the advantages that the joining device for parts of furniture or furnishing accessories of the present invention achieves are clear.

The joining device for parts of furniture and furnishing accessories of the present invention allows advantageously the assembly/disassembly of furniture or furnishing accessories in a rapid and easy manner also by non-expert users. In fact the constructional configuration of the joining device and, in particular, the cam mechanism 26, allows performing of the clamping or unclamping between the parts simply by imposing on said cam an overall rotation through 180° (by means of the tool 54) without the need for a particular or high torque value.

It has to be borne in mind that the overall rotation of the cam mechanism can also be different from that described with reference to the preferred embodiment and, for example, equal to 90° or 360° with consequent semi-rotations (first configuration of movement or expansion and second configuration of movement or action of traction) equal to 45° or 180° respectively.

Further advantageous is the fact that the device of the invention avoids the risk of a possible loosening of the restraint between the parts in connection. In fact the action of traction exerted on the expansion bushing by means of the backward movement of the lower slider through the effect of the movement imposed by the cam mechanism, imposing a further rotation on the same cam starting from the configuration of first movement or expansion, stiffens and makes more stable the restraint of clamping between the parts of the furniture in connection.

A further advantage is represented by the fact that only the clamping device of the invention allows the restraint and clamping to be formed between the parts using a single component (the clamping device 10) inserted in a seat formed in the thickness of one of the two components and without the need to have to use further components to be coupled such as, for example, in the case of a traditional expansion pin which, for the deformation in expansion of the bushing, needs an eccentric bushing (inserted in the thickness of the component facing that which houses the pin).

A further advantage of the joining device of the present invention is represented by the fact that it allows connection one to the other of parts of an item of furniture maintaining the joining device completely hidden from view so as to guarantee a high aesthetic value for the item of furniture or furnishing accessory assembled.

In a simplified embodiment, where excessive clamping force is not required between the two components of the item of furniture to be joined, only the first movement of the upper slider 22 can be provided, that is the first rotation of the cam mechanism 26, which determines both the expansion of the bushing 24 and the expansion of the externally serrated portions 15 with locking of the device 10 in the groove or pocket 66 of the shelf and simultaneous attachment in the further pocket 68 of the shoulder of the item of furniture. In this case the lower slider 20 would not be necessary and the cam mechanism 26 could have only the upper lobe 46.

Although the invention has been described above with particular reference to one of its embodiments given solely by way of a non-limiting example, numerous changes and variations will appear clear to a person skilled in the art in light of the description given above. The present invention therefore intends to embrace all the changes and variations which come within the scope of the following claims.

What is claimed is:

1. A joining device for parts of furniture and furnishing accessories, of the shelf unit, bookcase, drawer unit, bed frame, seating type and the like, comprising:
   a casing or container body suitable for being inserted in a seat formed in one of the components of the item of furniture to be joined and provided with an expansion bushing externally projecting with respect to a first end or front open end of said casing or container body and suitable for engaging with a further seat of a further component of the item of furniture to be joined to the component wherein the casing or container body is inserted;

wherein said joining device comprises a cam mechanism for a linear motion of actuation means co-operating in an expansion deformation movement of the expansion bushing and a simultaneous expansion of at least a portion of said casing or containment body;

wherein said cam mechanism and actuation means are housed in the casing or container body and are configured to be actuated by a tool;

wherein said linear motion of actuation means comprises a first slider comprising a front portion opposite a wedge-shaped base portion, where the first slider is configured to move in a direction towards said first end or front open end of said casing or container body due to a first rotational movement of the cam mechanism by the tool where the front portion slidably inserts in said expansion bushing, and where the wedge-shaped base portion is positioned at the at least a portion of said casing or containment body, the at least a portion of said casing or containment body comprising a bevelled edge of a second end or rear open end of the said casing or container body, the at least a portion configured to expand upon said first slider's movement towards said first end or front open end of said casing or container body;

wherein the cam mechanism comprises a central body which, at a central portion of the outer lateral surface, includes a first lobe along a plane perpendicular to the axis of the central body and is configured to come into contact with an internal profile of the first slider, the engagement of the first lobe with the internal profile of the first slider configured to move the first slider in the direction towards said first end or front open end of said casing or container body;

wherein said linear motion of actuation means comprises a second slider sliding in a direction away from said first end or front open end of said casing or container body due to a second rotational movement of the cam mechanism by the tool, the second slider configured to create a backward and traction movement of said expansion bushing;

wherein the second slider comprises a head portion supporting the expansion bushing, where the expansion bushing and head portion are non-slidably connected to one another;

wherein the cam mechanism comprises a second lobe substantially opposite and parallel to the first lobe, where the second lobe is configured to come into contact with an internal profile of the second slider, the engagement of the second lobe with the internal profile of the second slider configured to move the second slider in the direction away from said first end or front open end of said casing or container bod.

2. The joining device according to claim 1, wherein the central body of the cam mechanism comprises a central hole, optionally through and shaped to allow the introduction of the tool apt to actuate the rotation of said cam mechanism.

3. The joining device according to claim 1, wherein the expansion bushing is made in a single piece and comprises a cross cut made along diametrical perpendicular planes to define four wings externally provided with teeth formed in radial direction.

4. The joining device according to claim 1, wherein the casing or container body comprises a first half-shell and a second half-shell, each having a respective hole or through opening formed in a perpendicular direction to the longitudinal axis of said half-shells and coaxial with a through slot of the first slider and with a further through slot of the possible second slider, said holes being suitable for holding, respectively, an upper portion and a lower portion of the central body of the cam mechanism and for supporting the rotation of said cam mechanism.

5. The joining devices according to claim 1, wherein the first rotational movement is 90 degrees.

6. The joining devices according to claim 1, wherein the second rotational movement is 90 degrees.

7. The joining devices according to claim 1, wherein the first and second rotational movement are in the same rotational direction.

8. The joining devices according to claim 1, wherein the second rotational movement starts after the first rotational movement.

9. The joining devices according to claim 1, wherein the second rotational movement is a further movement of the first rotational movement.

* * * * *